US009549184B2

(12) United States Patent
Wang et al.

(10) Patent No.: US 9,549,184 B2
(45) Date of Patent: Jan. 17, 2017

(54) IMAGE PREDICTION METHOD AND SYSTEM

(75) Inventors: Ronggang Wang, Shenzhen (CN); Yongbing Zhang, Beijing (CN)

(73) Assignee: Orange, Paris (FR)

( * ) Notice: Subject to any disclaimer, the term of this patent is extended or adjusted under 35 U.S.C. 154(b) by 706 days.

(21) Appl. No.: 13/125,986

(22) PCT Filed: Oct. 20, 2009

(86) PCT No.: PCT/IB2009/055216
§ 371 (c)(1),
(2), (4) Date: Apr. 26, 2011

(87) PCT Pub. No.: WO2010/049916
PCT Pub. Date: May 6, 2010

(65) Prior Publication Data
US 2011/0206129 A1    Aug. 25, 2011

(30) Foreign Application Priority Data

Oct. 31, 2008 (WO) ................ PCT/CN2008/072901

(51) Int. Cl.
*H04N 7/32* (2006.01)
*H04N 11/00* (2006.01)
(Continued)

(52) U.S. Cl.
CPC .......... *H04N 19/105* (2014.11); *H04N 19/395* (2014.11); *H04N 19/577* (2014.11)

(58) Field of Classification Search
CPC ... H04N 19/105; H04N 19/395; H04N 19/577
(Continued)

(56) References Cited

U.S. PATENT DOCUMENTS

2004/0101058 A1* 5/2004 Sasai et al. ............. 375/240.26
2007/0086526 A1* 4/2007 Koto et al. ............. 375/240.16
(Continued)

FOREIGN PATENT DOCUMENTS

WO    WO 2007/077243 A2    7/2007
WO    WO 2008/112072 A2    9/2008

OTHER PUBLICATIONS

Liu et al., "Wyner-Ziv Video Coding with Multi-resolution Motion Refinement: Theoretical Analysis and Practical Significance," Visual Communications and Image Processing, Jan. 29, 2008-Jan. 31, 2008, San Jose, CA, USA, pp. 1-11.

*Primary Examiner* — Tat Chio
*Assistant Examiner* — On S Mung
(74) *Attorney, Agent, or Firm* — Drinker Biddle & Reath LLP

(57) ABSTRACT

A method is provided for computing a predicted frame from a first and a second reference frames, the method comprising, for each block of pixels in the predicted frame, the acts of defining a first block of pixels in the first reference frame collocated with a third block of pixels which is the block of pixels in the predicted frame; defining a second block of pixels corresponding, in the second reference frame, to the first block of pixels along the motion vector of the first block from the first to second reference frames; computing a first set of coefficients allowing the transformation of the pixels of the first block into pixels of the second block; computing pixels of the third block using the first set of coefficients and pixels from a fourth block collocated in the first reference frame with the second block of pixels.

7 Claims, 14 Drawing Sheets

(51) Int. Cl.
 *H04N 19/105* (2014.01)
 *H04N 19/577* (2014.01)
 *H04N 19/30* (2014.01)

(58) Field of Classification Search
 USPC ............ 375/240.12, 240.16, 240.24, 240.26
 See application file for complete search history.

(56) References Cited

U.S. PATENT DOCUMENTS

| | | | |
|---|---|---|---|
| 2007/0291844 A1* | 12/2007 | Lu ............................ | 375/240.16 |
| 2008/0056366 A1* | 3/2008 | Bhaskaran ............ | H04N 19/51 |
| | | | 375/240.16 |
| 2008/0117977 A1* | 5/2008 | Lee et al. ................. | 375/240.16 |
| 2008/0159391 A1 | 7/2008 | He et al. | |
| 2010/0202532 A1* | 8/2010 | Webb ....................... | 375/240.16 |

* cited by examiner

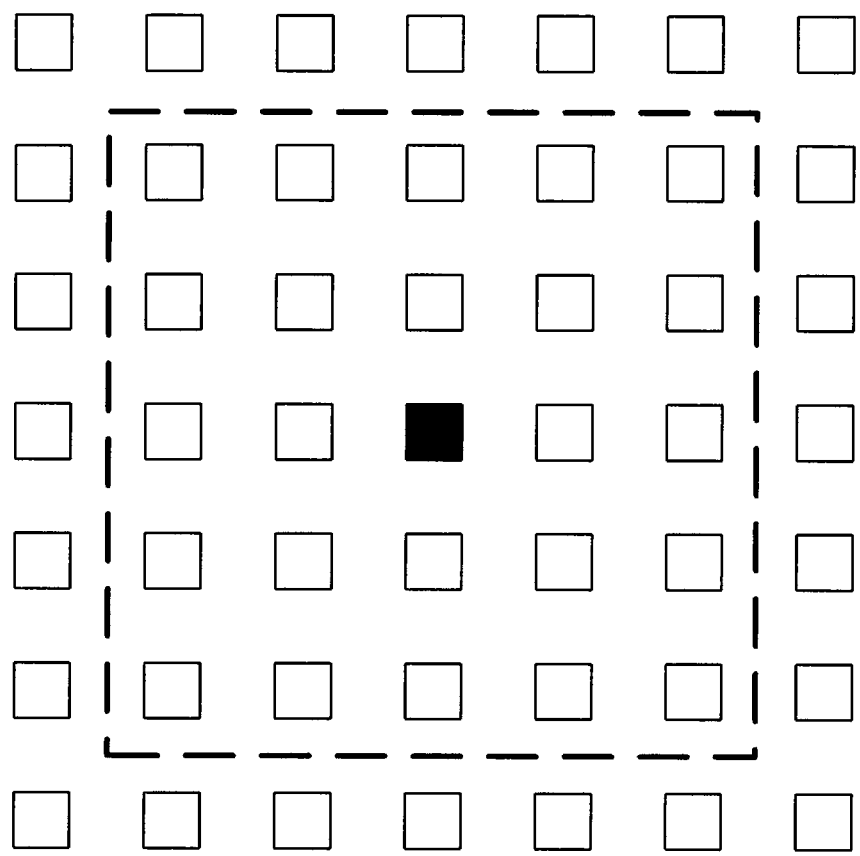

IMAGE PREDICTION METHOD AND SYSTEM

CROSS-REFERENCE TO RELATED APPLICATIONS

This application is the U.S. national phase of the International Patent Application No. PCT/IB2009/055216 filed Oct. 13, 2009, which claims the benefit of the International Patent Application No. PCT/CN2008/072901 filed in the Chinese Receiving Office on Oct. 31, 2008, the entire content of which is incorporated herein by reference.

FIELD OF THE INVENTION

The invention relates in general to image processing and more specifically to image prediction.

BACKGROUND

Prediction is a statistical estimation process where one or more random variables are estimated from observations of other random variables. It is called prediction when the variables to be estimated are in some sense associated with the "future" and the observable variables are associated with the "past". One of the simplest, prevalent prediction techniques is linear prediction. Linear prediction consists for instance in predicting a vector from another vector. The most common use of prediction is the estimation of a sample of a stationary random process (i.e. a random stochastic process whose joint probability distribution does not change when shifted in time or space) from observations of several prior samples. Another application of prediction is, in image/video compression, when a block of pixels is estimated from an observed "prior" block of pixels comprised in a reference image (also called forward image). In this case, each predicted image (or picture or frame) is divided into non-overlapped rectangular blocks. Motion vectors (i.e. the vectors used for prediction that provides an offset from the coordinates in the predicted picture to the coordinates in a reference picture) of each block are derived using Motion Estimation (ME) in the reference picture. Then, each block is predicted using Motion Compensation (MC) with reference to the corresponding block in the reference frame pointed by the derived motion vectors. Both ME and MC are methods known to the person skilled in the art. This method may help eliminating redundancy information and, consequently, fewer bits may be needed to describe the residual (which is the difference between the original and the predicted block). However, such ME/MC prediction method is actually not the ultimate solution for predicting future frames as it is based on the assumption that the captured moving object is performing translation motion, which is not always true. Besides, for the estimation of images involving non-Gaussian processes, the ME/MC technique cannot fully squeeze out all possible information about the past that will help predicting future frames.

Today there is a need for an image prediction solution that can easily be implemented on the existing communication infrastructures, overcoming the drawbacks of the prior art.

SUMMARY

It is an object of the present system to overcome disadvantages and/or make improvement over the prior art.

To that extent, an embodiment of, the invention proposes a method for computing a predicted frame from a first and a second reference frames, said method comprising, for each block of pixels in the predicted frame:
  a) defining a first block of pixels in the first reference frame collocated with the block of pixels in the predicted frame,
  b) defining a second block of pixels corresponding, in the second reference frame, to the first collocated block of pixels along the motion vector of said collocated block from said first to second references frames,
  c1) computing a first set of coefficients allowing the transformation of the pixels of the collocated block into pixels of the second block,
  d) computing pixels of the predicted frame block using the first set of coefficients and pixels from a fourth block collocated in the first reference frame with the second block of pixels.

An embodiment of the invention also relates to an interpolating device for computing a predicted frame from a first and a second reference frames of a video flow, said device being arranged to select said first and second frames from the video flow, said device being further arranged for each block of pixels in the predicted frame to: a) define a first block of pixels in the first reference frame collocated with a third block of pixels which is the block of pixels in the predicted frame, b) define a second block of pixels corresponding, in the second reference frame, to the first block of pixels along the motion vector of said first block from said first to second reference frames, c1) compute a first set of coefficients allowing a transformation of the pixels of the first block into pixels of the second block, and d1) compute pixels of the third block using the first set of coefficients and pixels from a fourth block collocated in the first reference frame with the second block of pixels.

An embodiment of the invention also relates to a system for computing a predicted frame from a first and a second reference frames of a video flow, said system comprising: a transmitting device for transmitting the video flow, an interpolating device arranged to: receive the video flow from the transmitting device, and select said first and second frames from the video flow, said device being further arranged for, for each block of pixels in the predicted frame, to: a) define a first block of pixels in the first reference frame collocated with a third block of pixels which is the block of pixels in the predicted frame, b) define a second block of pixels corresponding, in the second reference frame, to the first block of pixels along a motion vector of said first block from said first to second reference frames, c1) compute a first set of coefficients allowing a transformation of the pixels of the first block into pixels of the second block, and d1) compute pixels of the third block using the first set of coefficients and pixels from a fourth block collocated in the first reference frame with the second block of pixels.

An embodiment of the invention also relates to a non-transitory computer program product providing computer executable instructions stored on a computer readable medium, which when loaded on to a data processor causes the data processor to perform the method for computing a predicted frame from a first and a second reference frames described above.

An advantage of the proposed method is that it may adaptively exploit the redundancies to adjust the motion information derived between successive frames according to the characteristics of pixels within a local spatiotemporal area.

Another advantage of the proposed method in comparison to existing solutions is that it is able to adaptively tune interpolation coefficients (to predict pixels from existing pixels in previous frames) to match the non-stationary statistical properties of video signals. The interpolation coefficients play a critical role for the accuracy of the prediction. The more the coefficients are accurate, the more the predicted frames are reliable. These coefficients may involve a heavy burden in terms of bit rate for the video compression. Thus, the method according to the invention proposes an algorithm to derive more accurate coefficients for the first block by exploiting the high similarities between the same objects of adjacent frames, releasing hence the nontrivial burden of transmitting such coefficients.

BRIEF DESCRIPTION OF THE DRAWINGS

Embodiments of the present invention will now be described solely by way of example and only with reference to the accompanying drawings, where like parts are provided with corresponding reference numerals, and in which:

FIG. 4B schematically illustrates an example of spatial neighborhood used to interpolate a corresponding fractional pixel according to an embodiment of the present invention;

DESCRIPTION OF PREFERRED EMBODIMENTS

The following are descriptions of exemplary embodiments that when taken in conjunction with the drawings will demonstrate the above noted features and advantages, and introduce further ones.

In the following description, for purposes of explanation rather than limitation, specific details are set forth such as architecture, interfaces, techniques, devices etc. . . . , for illustration. However, it will be apparent to those of ordinary skill in the art that other embodiments that depart from these details would still be understood to be within the scope of the appended claims.

Moreover, for the purpose of clarity, detailed descriptions of well-known devices, systems, and methods are omitted so as not to obscure the description of the present system. Furthermore, routers, servers, nodes, base stations, gateways or other entities in a telecommunication network are not detailed as their implementation is beyond the scope of the present system and method.

In addition, it should be expressly understood that the drawings are included for illustrative purposes and do not represent the scope of the present system.

The method according to the invention proposes a model for predicting an image (i.e. called predicted or current image/frame) based on observations made in previous images. In the method according to the invention, the prediction is performed in the unit of block of pixels and may be performed for each block of the predicted image. In extenso, an image may be assimilated to a block (of pixels). By collocated blocks in a first image and a second image, one may understand blocks that are in the exact same location in the two images. For example, in FIG. 2, blocks $B_t(k,l)$ and $B_{t-1}(k,l)$ are collocated blocks.

Figure 3A:
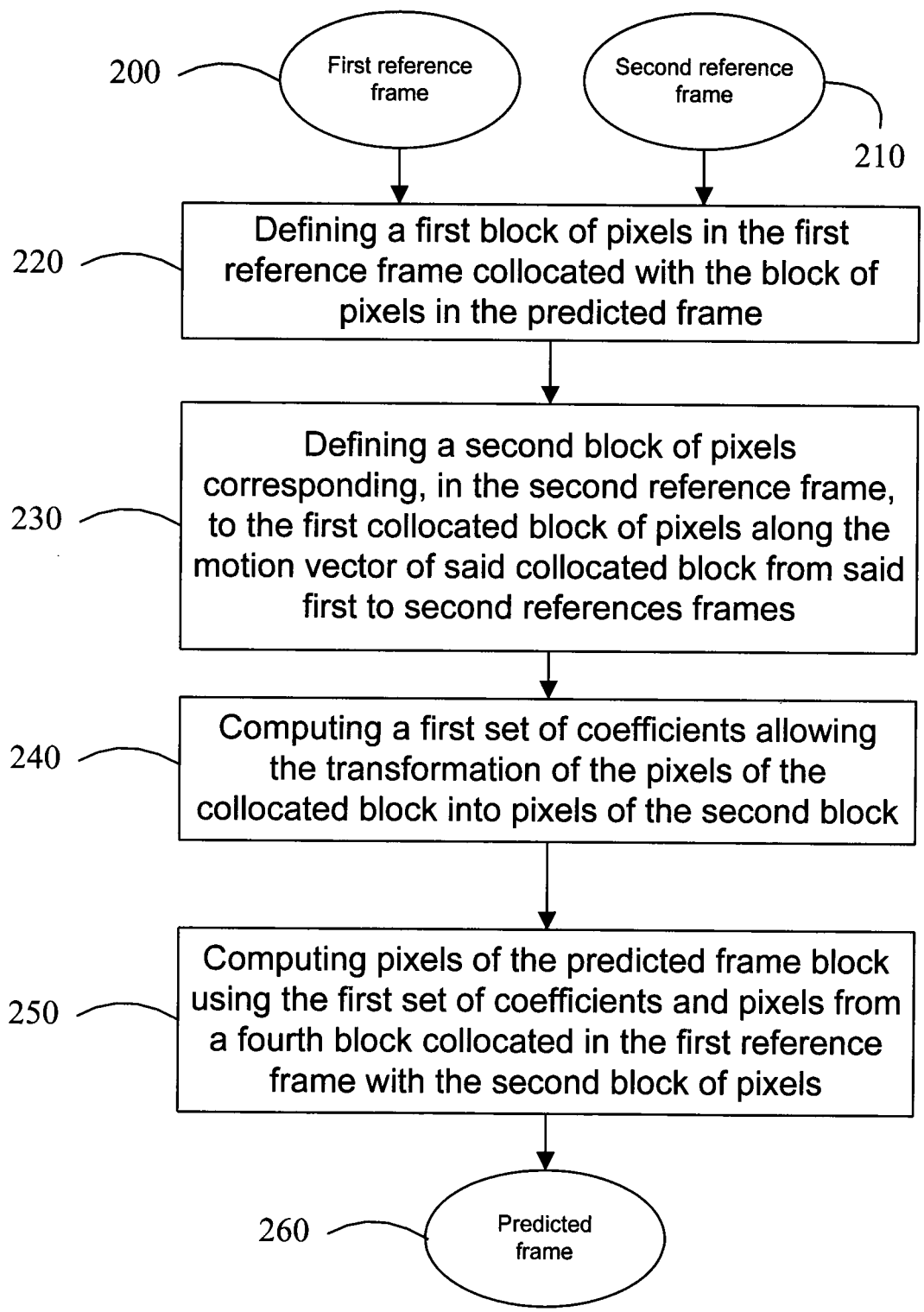
FIG. 3A schematically illustrates the method according to an embodiment of the present invention.

FIG. 3A describes an illustrative embodiment of the method according to the invention, wherein a predicted frame 260 (i.e. a frame to be predicted) is computed from a first reference frame 200 and a second reference frame 210, both known and prior to the predicted frame. All the images may be in a flow of images.

In this illustrative embodiment, the method comprises, for each block of pixels to be predicted in the predicted frame 260, an act 220 allowing defining a first block of pixels in the first reference frame collocated with the block of pixels (named third block) to be predicted in the predicted frame. Then, act 230 allows defining a second block of pixels corresponding, in the second reference frame, to the first collocated block of pixels along the motion vector of said collocated block from said first to second references frames. A motion vector is a vector used for inter prediction that provides an offset from the coordinates in the predicted picture to the coordinates in a reference picture. It is used to represent a macroblock or a pixel in the predicted picture based on the position of this macroblock or pixel (or a similar one) in the reference picture. As the first and second reference pictures are known pictures, techniques readily available to the man skilled in the art may be used to derive the motion vector of the collocated block from the first to the second reference frames, and consequently the second block can be defined. Subsequently, a first set of coefficients can be computed in act 240 to allow the transformation of the pixels of the collocated block into pixels of the second block. Eventually, act 250 allows computing pixels of the predicted frame block using the first set of coefficients and pixels from a fourth block collocated in the first reference frame with the second block of pixels.

In the method according to the invention, the block of pixels to be predicted is derived from the fourth block of pixels in the first reference frame using the first set of coefficient. Using the fourth block to derive the block of pixels to be predicted in the predicted frame implies thus, as the second and fourth block are collocated in respectively the second and first reference frames that the motion vector used for the definition of the second block is the same as the motion vector for establishing the relationship between the fourth block and the block of pixels to be predicted.

Figure 1:
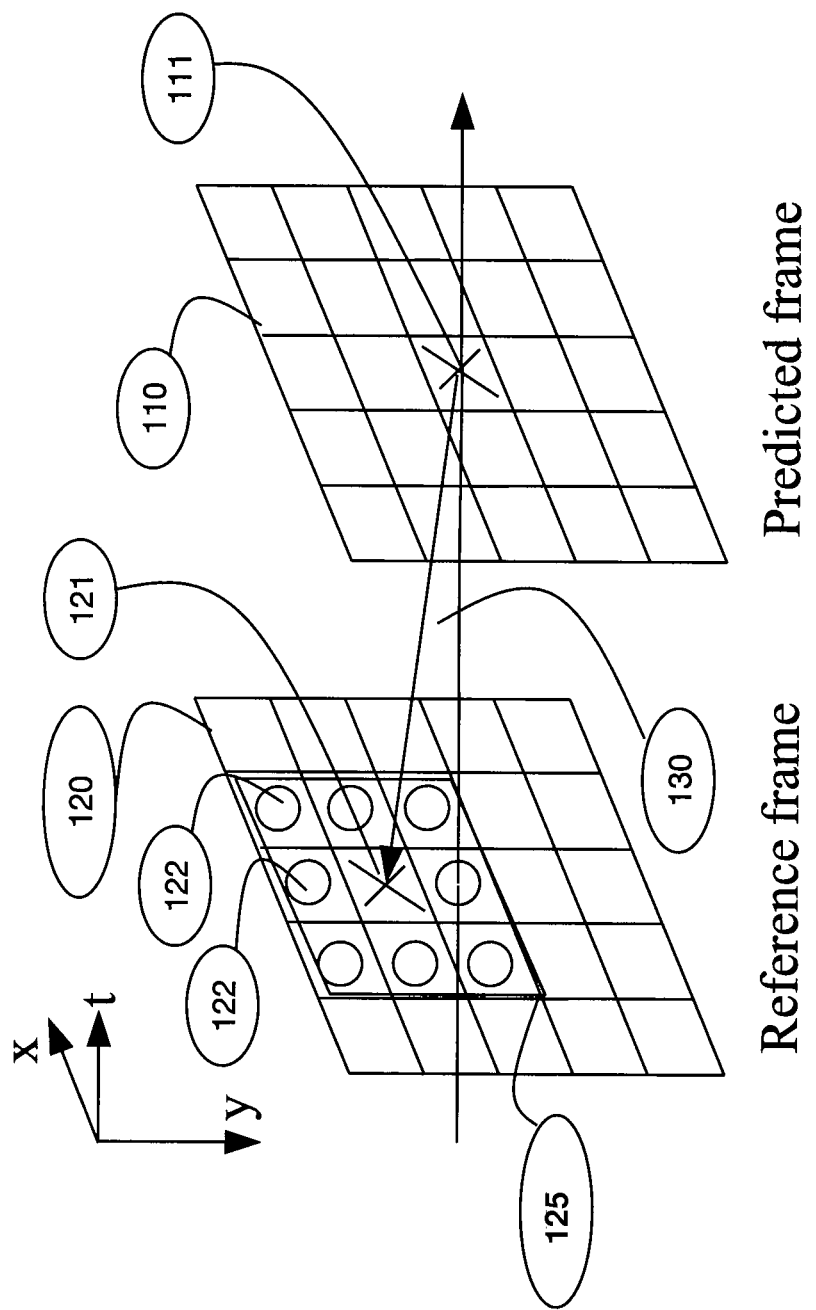
FIG. 1 schematically illustrates an example of pixel prediction in a predicted image from pixels in a reference image according to an embodiment of the present invention.

FIG. 1 schematically describes the prediction of a pixel 111 in a predicted frame 110 from pixels in a reference frame 120 along the motion vector 130 linking the pixel to be predicted 111 and its corresponding pixel 122 in the reference frame 120.

As shown in FIG. 1, for each pixel 111 in the predicted frame 110, the corresponding pixel 121 in the reference frame 120 is derived along the motion trajectory (shown in FIG. 1 through motion vector 130). A square spatial neighborhood 125, centered on the corresponding pixel 121 in the reference frame 120 is defined. The pixel 111 in the predicted frame is thus approximated as a linear combination of the pixels 122 of the corresponding spatial neighborhood 125 in the reference frame 120. This interpolation process may be expressed as $$\hat{Y}_t(m, n) = \sum_{-r \leq (i,j) \leq r} X_{t-1}(\tilde{m} + i, \tilde{n} + j)\alpha_{i,j} + n_t(m, n) \quad (1)$$

Where:
$\hat{Y}_t(m,n)$ represents the predicted pixel 111 located at coordinates (m,n) in the predicted frame 110,
$X_{t-1}$ corresponds to a representation of the pixels in the reference frame 120,
$(\tilde{m},\tilde{n})$ represents the position of the corresponding pixel 121 in the reference frame 120 pointed by the motion vector 130 of the corresponding predicted pixel 111 located at (m,n) in the predicted frame 110 through $\hat{Y}_t(m,n)$,
$\alpha_{i,j}$ the interpolation coefficients,
$n_t(m,n)$ is the additive Gaussian white noise.

Interpolation coefficients may be derived using methods known from the person skilled in the art such as e.g. the Mean Squared Error (MSE) method and the Least Mean Square (LMS) method as explained further hereunder.

The radius r of the interpolation set or interpolation filter (i.e. set of interpolation coefficients for the square spatial neighborhood 125) may be used to define the size of the interpolation filter as: (2r+1)×(2r+1). For instance in FIG. 1, the radius is r=1 and the size of the interpolation filter is 3×3.

Figure 2:
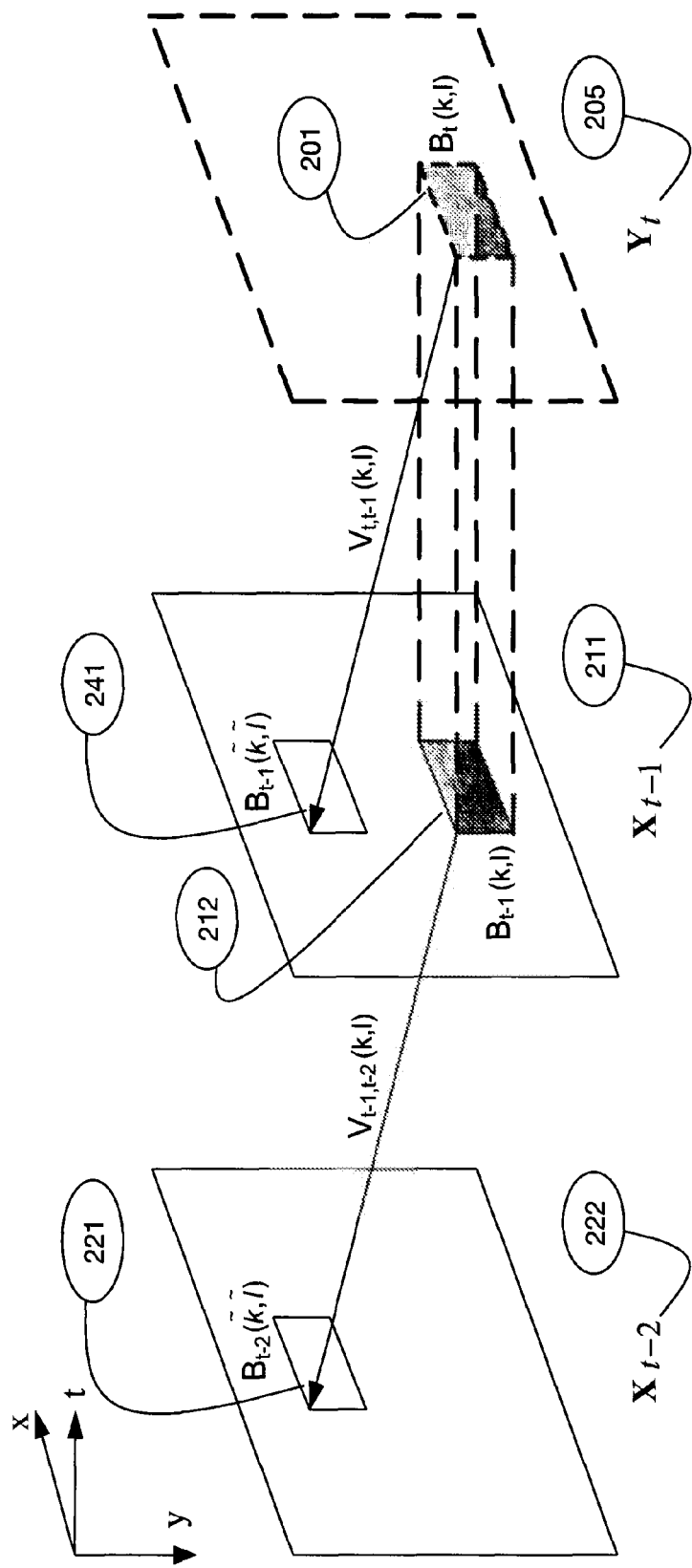
FIG. 2 schematically illustrates blocks and frames used in the method according to an embodiment of the present invention.

FIG. 2 describes the frames used in the method according to the invention. The interpolation coefficients used to derive each block of pixels in the predicted frame $Y_t$ 205 are derived using a first reference frame $X_{t-1}$ 211 and a second reference frame $X_{t-2}$ 222.

A first block $B_{t-1}(k,l)$ 212 in the first reference frame $X_{t-1}$ 211 is defined as being the collocated block of a block of pixels (third block) $B_t(k,l)$ 201 to be predicted in the predicted frame $Y_t$ 205.

As the first and the second reference frames are both known and defined, existing method known from the person skilled in the art allows defining a second block $B_{t-2}(\tilde{k},\tilde{l})$ along the motion vector $v_{t-1,t-2}(k,l)$ of the collocated (or first) block $B_{t-1}(k,l)$ 212 from the first reference frame $X_{t-1}$ to the second reference frame $X_{t-2}$.

A first set of interpolation coefficients may thus be defined as described in FIG. 1 from known pixels in the first and the second reference frames.

The collocated block in the first reference frame $B_{t-1}(\tilde{k},\tilde{l})$ 241 (also called fourth block in reference to FIG. 3A) of $B_{t-2}(\tilde{k},\tilde{l})$ 221 in the second reference frame 222 is then used along with the first set of coefficients previously obtained here above to derive the predicted pixels in the block of pixels (or third block) $B_t(k,l)$ to be predicted 201 in the predicted frame 205.

Figure 3B:
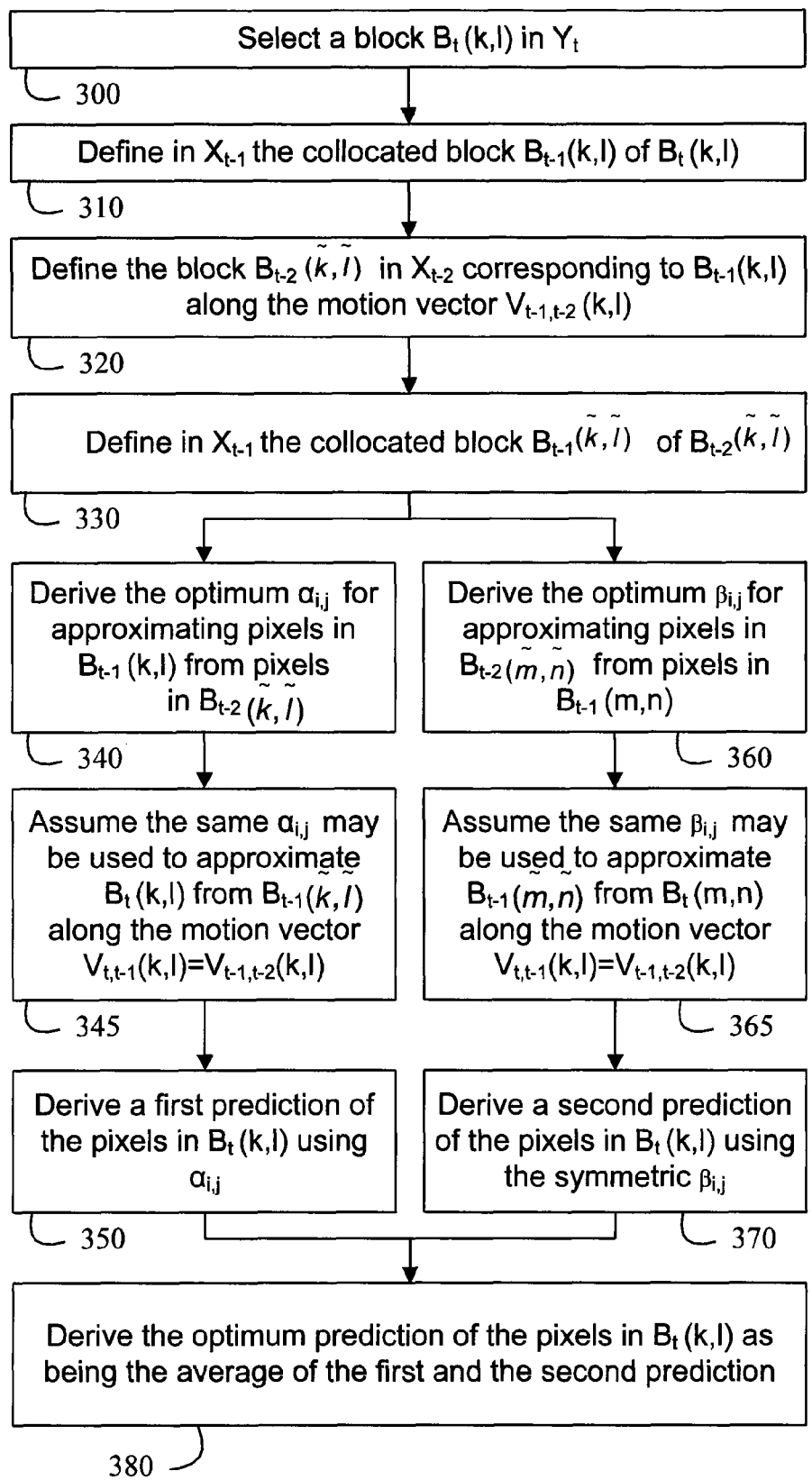
FIG. 3B schematically illustrates the method according to an embodiment of the present invention.

FIG. 3B describes an illustrative embodiment of the method according to the invention.

A block of pixels to be predicted $B_t(k,l)$ is selected in the predicted frame $Y_t$ in an act 300. A first block $B_{t-1}(k,l)$ in $X_{t-1}$ collocated with the block of pixels to be predicted in $Y_t$ is then defined in act 310. As $X_{t-1}$ and $X_{t-2}$ are both known and defined, a second block $B_{t-2}(\tilde{k},\tilde{l})$ corresponding in $X_{t-2}$ to $B_{t-1}(k,l)$ may thus be defined along the motion vector $v_{t-1,t-2}(k,l)$ of the collocated block $B_{t-1}(k,l)$ 212 from the first reference frame $X_{t-1}$ to the second reference frame $X_{t-2}$ in act 320. A fourth block in $X_{t-1}$ $B_{t-1}(\tilde{k},\tilde{l})$ collocated with $B_{t-2}(\tilde{k},\tilde{l})$ is defined in act 330.

Applying the method described in FIG. 1, a first set of interpolation coefficients may be obtained by approximating pixels in the first block $B_{t-1}(k,l)$ from pixels in the second block $B_{t-2}(\tilde{k},\tilde{l})$ in act 340. In other words, it is assumed that each pixel in $B_{t-1}(k,l)$ is approximated as a linear combination of a square spatial neighborhood in block $B_{t-2}(\tilde{k},\tilde{l})$, centered on the corresponding pixel pointed by the motion $v_{t-1,t-2}(k,l)$:

$$\hat{Y}_{t-1}(m, n) = \sum_{-r \leq (i,j) \leq r} X_{t-2}(\tilde{m} + i, \tilde{n} + j)\alpha_{i,j} + n_{t-1}(m, n) \quad (2)$$

The pixel approximation depends on the definition of the interpolation coefficient. Indeed, these should be chosen to be the optimum ones.

In equation (2), pixels in $X_{t-2}$ are known. Besides, pixels in $Y_{t-1}$ are also known so the pixels approximates by equation (2) may be compared to the corresponding real pixels in $Y_{t-1}$ in order to derive the interpolation coefficients $\alpha_{i,j}$. This comparison is performed using, in this illustrative embodiment of the method according to the invention, as mentioned here above, the mean squared error (MSE) to define the resulting mean squared error:

$$\varepsilon^2(k, l) = \sum_{(m,n) \in B_{t-1}(k,l)} E(\|Y_{t-1}(m, n) - \hat{Y}_{t-1}(m, n)\|^2) \quad (3)$$

The MSE as a performance criterion may be viewed as a measure of how much the energy of the signal is reduced by removing the predictable information based on the observation from it. Since the goal of a predictor is to remove this predictable information, a better predictor corresponds to a smaller MSE.

The Least-Mean-Square (LMS) method may then be used to derive the optimum interpolation coefficients.

The assumption is then made in act 345 that pixels in the block to be predicted may be approximated from pixels in the fourth block using the same first set of coefficient as there are high redundancies between the two reference and the predicted frames). Assuming the optimum interpolation coefficients derived using equation (3) are $\alpha_{i,j}$, the prediction of $B_t(k,l)$ may be then made as follows using the same coefficients and equation (1) as previously explained:

$$\hat{Y}_t(m, n) = \sum_{-r \leq (i,j) \leq r} X_{t-1}(\tilde{m} + i, \tilde{n} + j)\alpha_{i,j} + n_t(m, n) \quad (4)$$

wherein $\alpha_{i,j}$ are the interpolation coefficients obtained in equations (2) and (3).

It can be emphasized that the closer the frames in the stream of frames, the higher the redundancy and thus the better this assumption is. That may be emphasized that it is equivalent to say that the same motion vector is used, i.e.:

$$V_{t,t-1}(k,l)=V_{t-1,t-2}(k,l)$$

to derive a prediction of pixels in $B_t(k,l)$ from pixels in $B_{t-1}(\tilde{k},\tilde{l})$ (act 350) than to derive a prediction of pixels in $B_{t-1}(k,l)$ from pixels in $B_{t-2}(\tilde{k},\tilde{l})$.

Figure 3C:
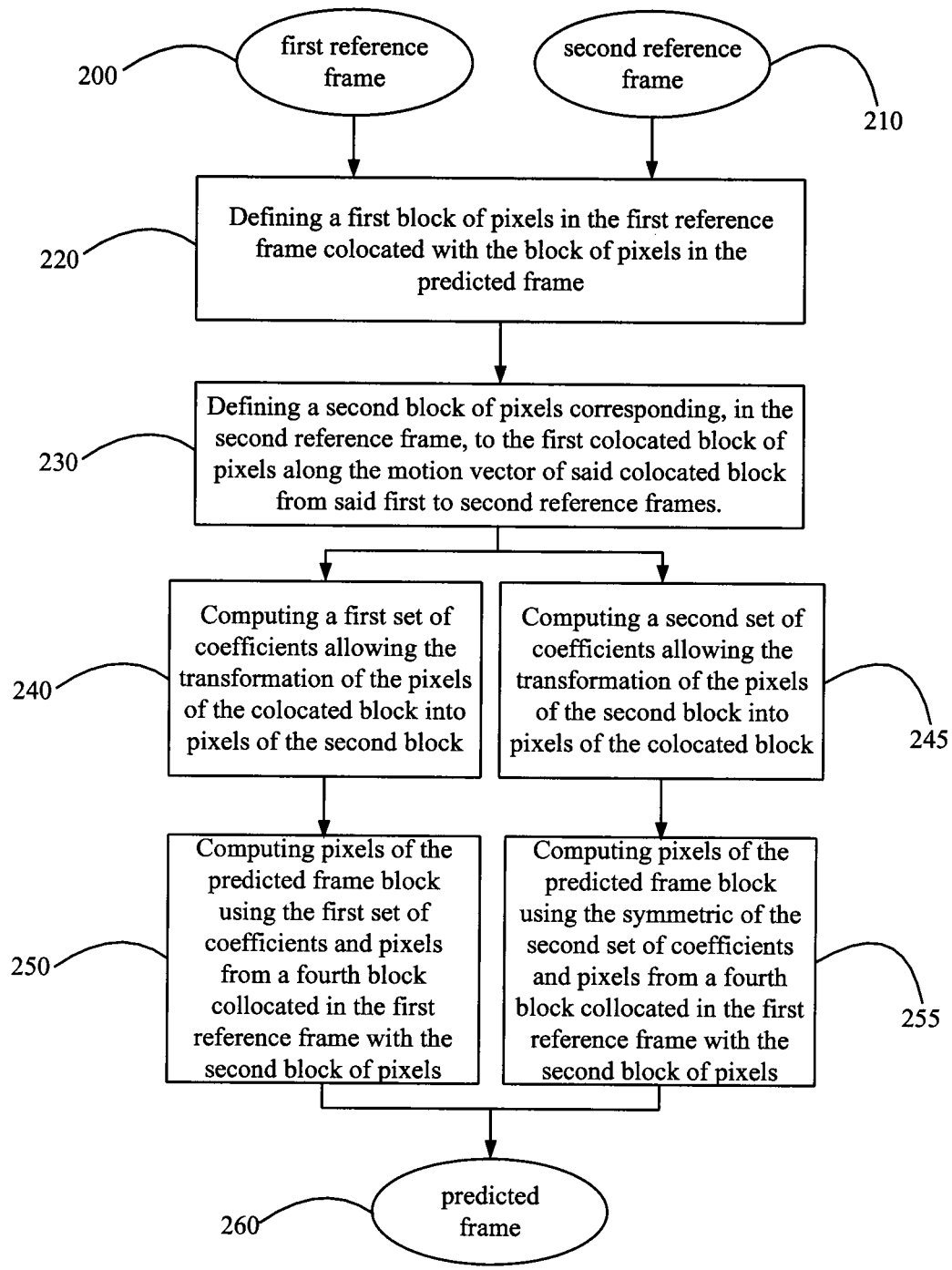
FIG. 3C schematically illustrates the method according to an additional embodiment of the present invention.

In an additional embodiment of the present invention, in reference to FIG. 3C, a second set of interpolation coefficient may be derived in order to increase the accuracy of the prediction of the pixels in the block of pixels to be predicted in the predicted frame.

Indeed, symmetrically, pixels in $B_{t-2}(\tilde{k},\tilde{l})$ may be approximated or expressed as linear combination of pixels of $B_{t-1}(k,l)$ using a second set of interpolation coefficients in act 245:

$$\hat{X}_{t-2}(\tilde{m},\tilde{n}) = \sum_{-r \leq (i,j) \leq r} X_{t-1}(m+i, n+j)\beta_{i,j} n_{t-2}(\tilde{m},\tilde{n}) \quad (5)$$

It then may be assumed that the same second set of coefficient may be used to approximate or express pixels in $B_{t-1}(\tilde{k},\tilde{l})$ from pixels in $B_t(k,l)$ using said second set of interpolation coefficients in act 255 (making again the assumption that there are high redundancies between the reference and predicted frames, e.g. when there are chosen as being adjacent frames in a stream of frames):

$$\hat{X}_{t-1}(\tilde{m},\tilde{n}) = \sum_{-r \leq (i,j) \leq r} Y_t(m+i, n+j)\beta_{i,j} + n_{t-1}(\tilde{m},\tilde{n}) \quad (6)$$

However here, as pixels in $B_t(k,l)$ are unknown (as being the ones to be predicted), they cannot be expressed as linear combinations of pixels in $B_{t-1}(\tilde{k},\tilde{l})$. But, as the mathematical expression is a linear combination, pixels in $B_t(k,l)$ may be expressed from pixels in $B_{t-1}(\tilde{k},\tilde{l})$ using the symmetric interpolation coefficients of the interpolation coefficients of the second set:

$$\beta'_{i,j} = \beta_{-i,-j} \quad (7)$$

$$\hat{Y}_t(m,n) = \sum_{-r \leq (i,j) \leq r} X_{t-1}(\tilde{m}+i, \tilde{n}+j)\beta'_{i,j} + n_t(m,n) \quad (8)$$

where $\beta'_{i,j}$ is the reverse one corresponding to the one derived in (5).

Eventually, with this optional embodiment of the method according to the invention, two sets of interpolation coefficients are derived/obtained, implying two expressions/approximations of pixels in $B_t(k,l)$ from pixels in $B_{t-1}(\tilde{k},\tilde{l})$. An optimum prediction may thus be derived, for each pixel, from these two approximations of the same pixel by taking the average or mean of the two:

$$\hat{Y}_t(m,n) = \quad (9)$$

$$\left( \sum_{-r \leq (i,j) \leq r} X_{t-1}(\tilde{m}+i, \tilde{n}+j)\alpha_{i,j} + \sum_{-r \leq (i,j) \leq r} X_{t-1}(\tilde{m}+i, \tilde{n}+j)\beta'_{i,j} \right) / 2 + n_t(m,n).$$

Indeed, equations (4) and (8) allows approximating the same pixel at (m,n) in frame $Y_t$ in two different directions (forward and backward), this implies that $\alpha_{i,j} \approx \beta'_{i,j}$, allowing improving the accuracy of the prediction.

Practically, in the case of, for example, an encoder/decoder system, the method according to the invention is based on the fact that the blocks of pixels in the first and second reference frames are available/known both to the encoder and decoder, allowing thus obtaining the predicted frame using data derived from these reference frames. The present method may also be implemented using an interpolating device for computing the predicted frame from a first and second reference frames in a video flow. The encoding, decoding or interpolating devices may typically electronic devices comprising a processor arranged to load executable instructions stored on a computer readable medium, causing said processor to perform the present method. The interpolating device may also be an encoder/decoder part of a system of computing the predicted frame from a first and second reference frames in a video flow, the system comprising a transmitting device for transmitting the video flow comprising the reference frames to the interpolating device for further computing of the predicted frame.

In this illustrative embodiment described here above, the motion vector is of pixel integer accuracy. However, the method according to the present invention may also achieve sub-pixel accuracy. This is because, in the existing/known quarter-pixel interpolation method (described on FIG. 4A), each sub-pixel is interpolated by a fixed filter tap (for example, a 6 tap filter means the interpolation utilizes the 6 nearest integer pixels), along the horizontal and vertical directions using the integer pixels closest to the sub-pixel to be interpolated.

Figure 4A:
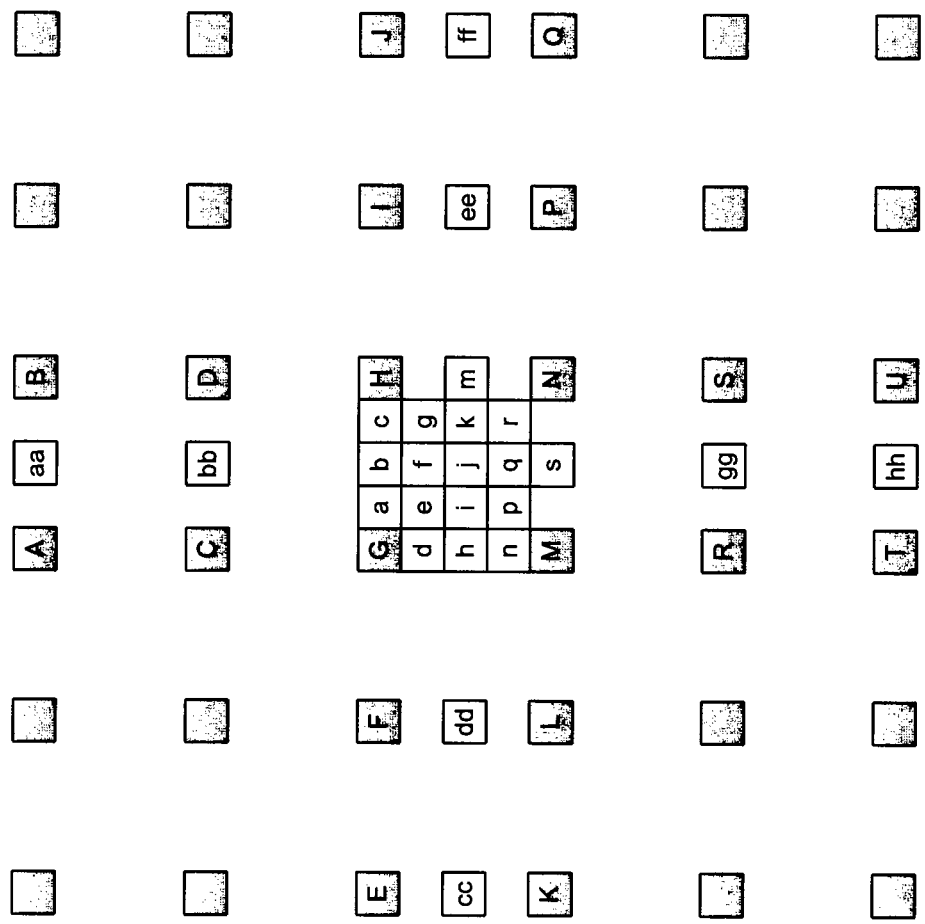
FIG. 4A schematically illustrates an example of integer samples and fractional sample positions for quarter sample luma interpolation in the traditional interpolation method.
Figure 5:
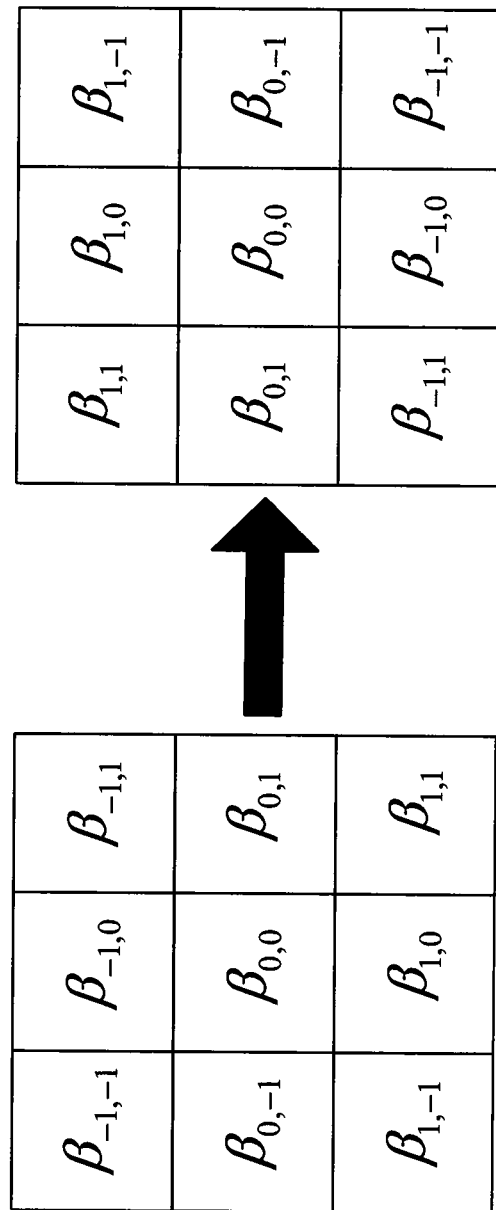
FIG. 5 schematically illustrates the transfer from the backward to the forward coefficients according to an embodiment of the present invention.

On FIG. 4A, integer samples (shaded blocks with upper-case letters) and fractional sample positions (un-shaded blocks with lower-case letters) for quarter sample luma interpolation (i.e. the resolution of the luma sample has been interpolated to 4 times of the original resolution both in the horizontal and vertical directions), are illustrated.

In such a case of sub-pixel accuracy, the method according to the invention may be applied, as shown in FIG. 4B (spatial neighborhood), as follows. For each sub-pixel, the closest integer pixel is found, then the corresponding sub-pixel is interpolated by the weighted linear combination of the integer pixels in a squared neighborhood centered at the closet integer pixel. By choosing adequate interpolation coefficients, it achieves the same result as existing sub-pixel interpolation methods. However, in the real image, the interpolation is only along the horizontal and vertical direction and may not always be accurate enough in the case of complex region using existing/known solutions. Besides, in existing methods, the interpolation tap and filter are always fixed, which further limits the accuracy of the interpolation results. Whereas, in the method according to the invention, the interpolation may be along any direction, i.e. the coefficients along a specific direction are significantly larger than the other directions, rather than restricted to the horizontal or the vertical direction. As an example, if there is an edge along the diagonal direction, the filter coefficients of the method according to the invention along the corresponding diagonal direction will be relatively larger than the coefficients in other positions, and thus improve the interpolation accuracy (while traditional filter can interpolate only along the horizontal or the vertical direction, and thus can not be adaptive to the edge direction). Furthermore, the interpolation coefficients may be adaptively tuned according to the characteristics of pixels in the adjacent spatial neighborhood.

Figure 6:
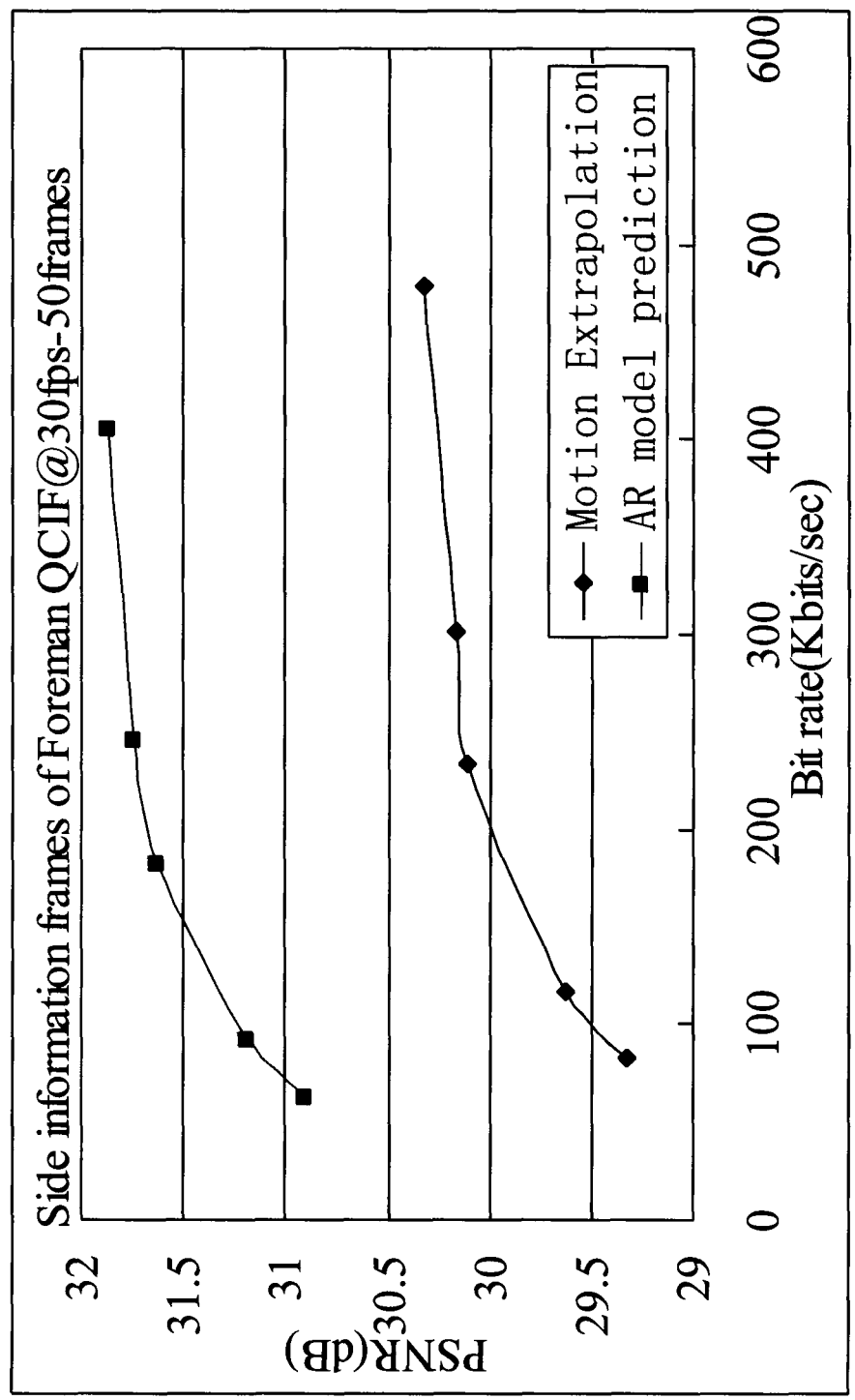
FIG. 6 is a comparison of the side-information generated by the method according to the invention with the existing motion extrapolation based approaches in DVC coding-"foreman"
Figure 7:
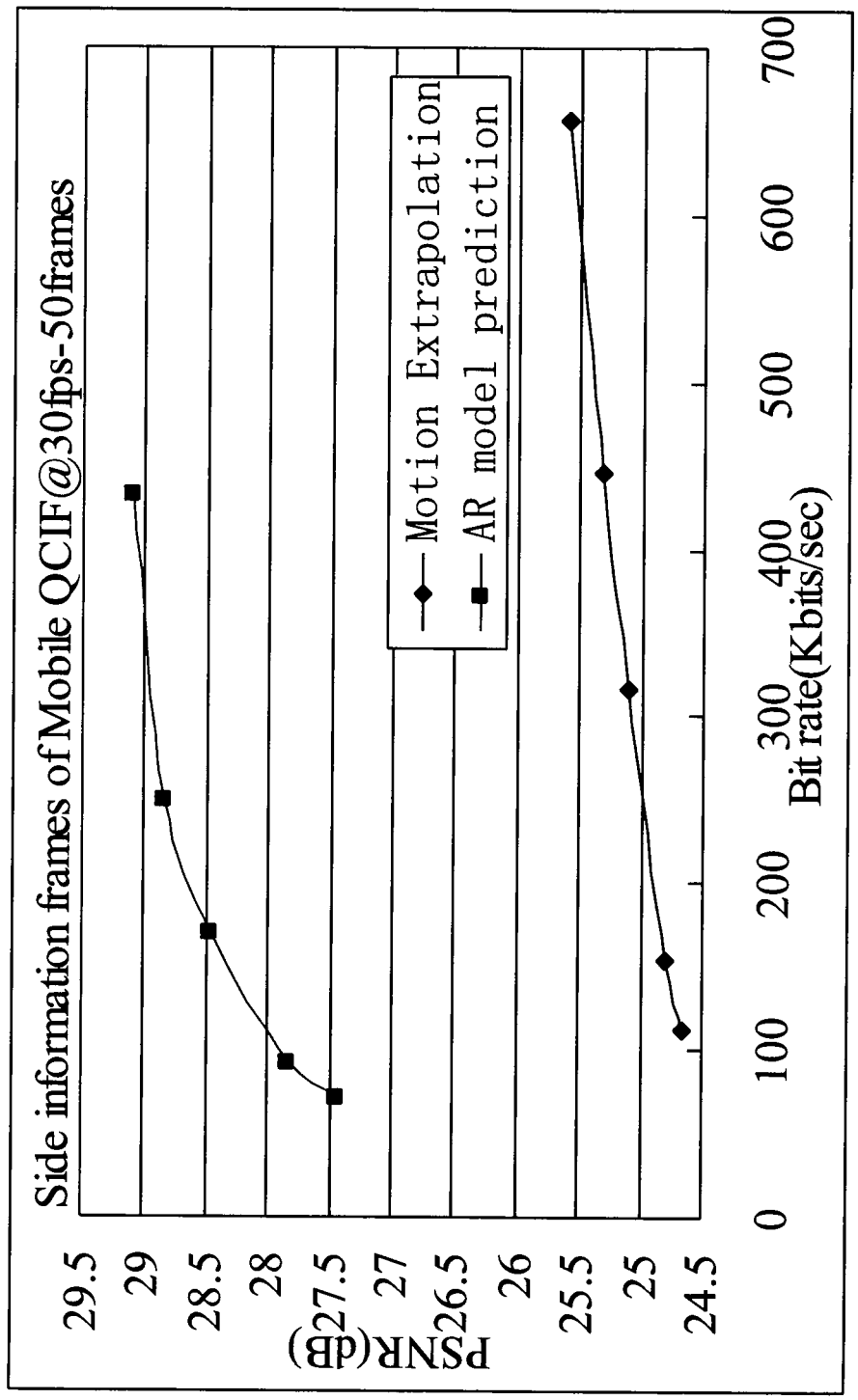
FIG. 7 is a comparison of the side-information generated by the method according to the invention with the existing motion extrapolation based approaches in DVC coding-"Mobile"
Figure 8:
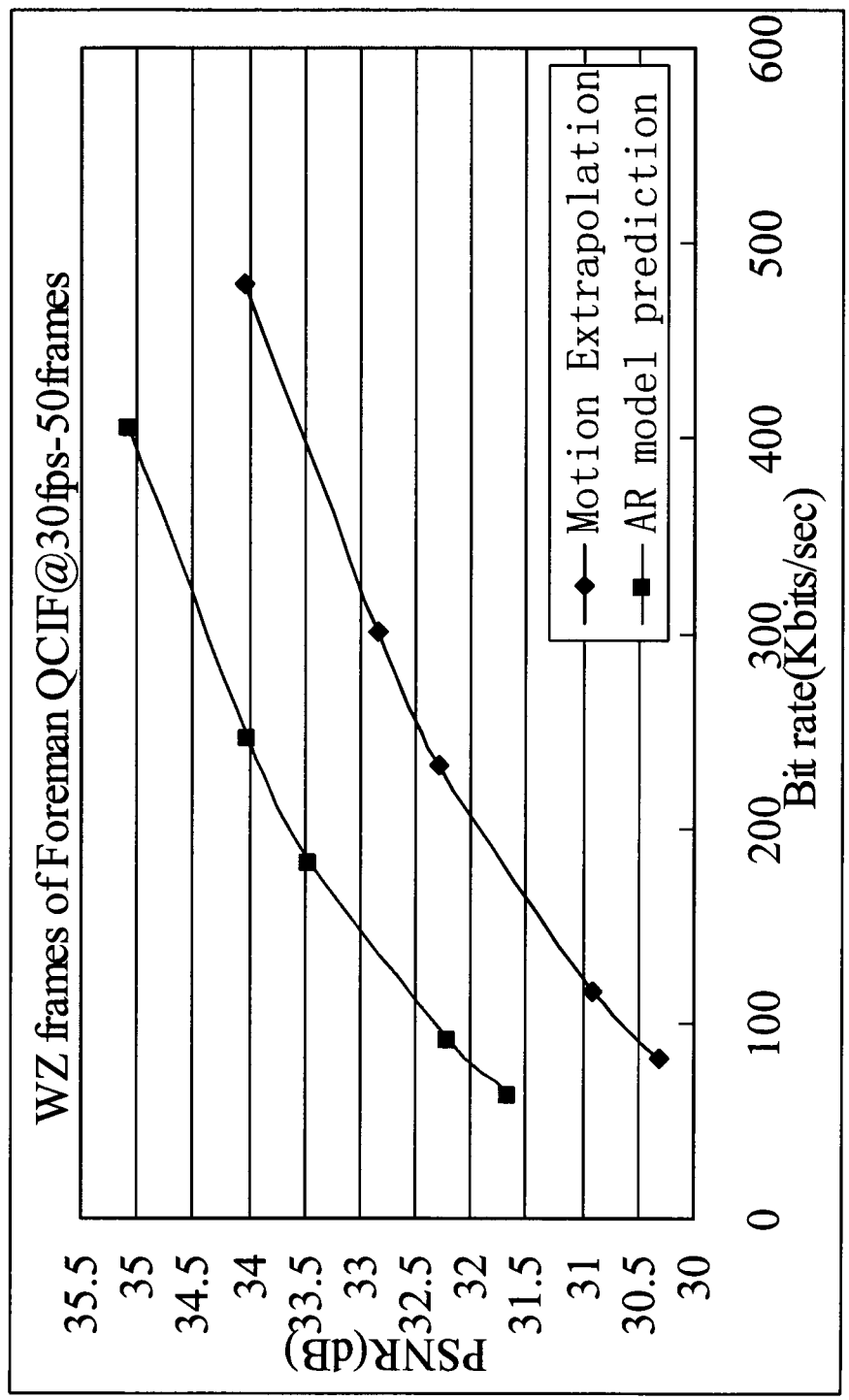
FIG. 8 is a comparison of the rebuilt WZ frames generated by the method according to the invention with the existing motion extrapolation based approaches in DVC coding-"foreman"
Figure 9:
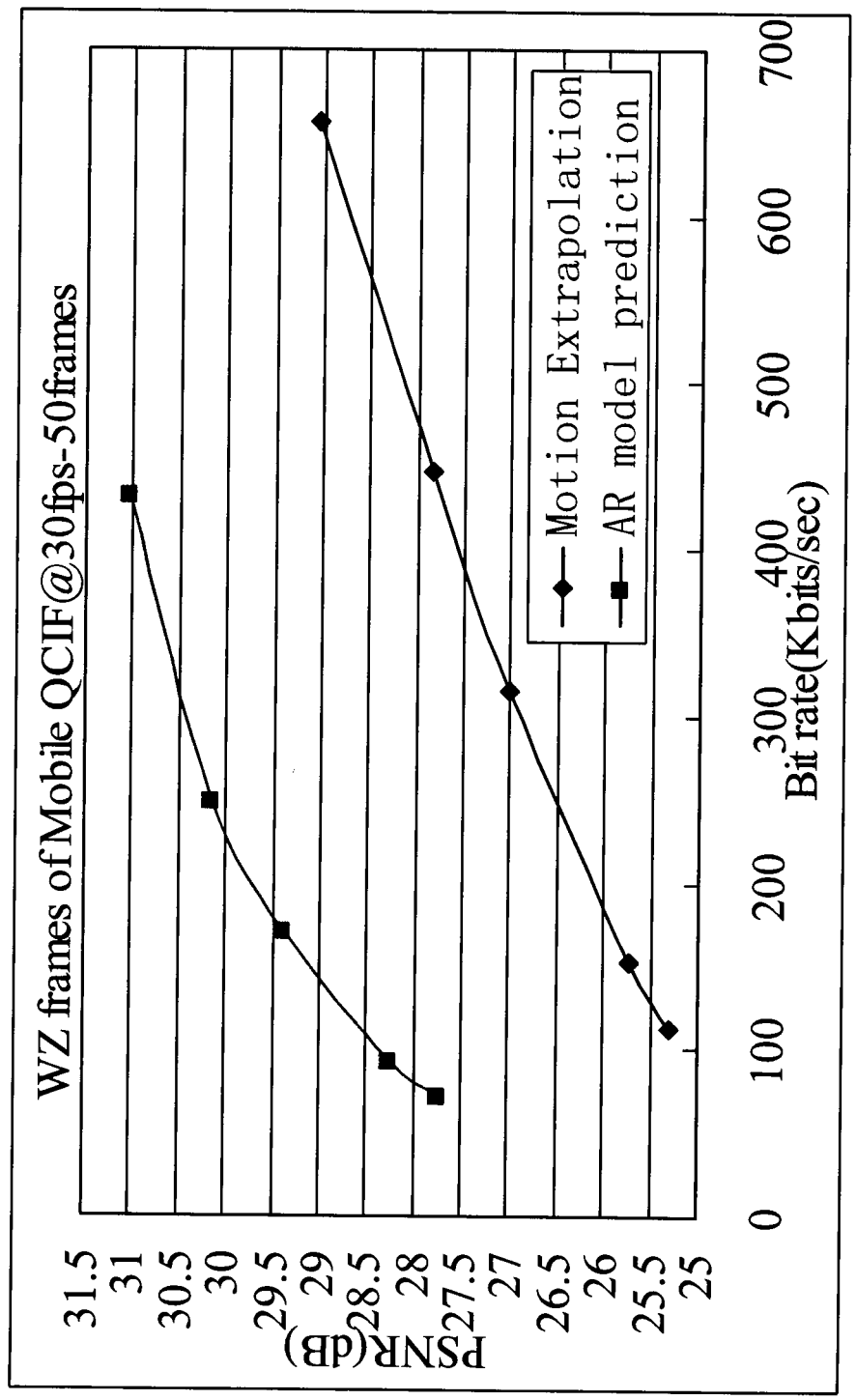
FIG. 9 is a comparison of the rebuilt WZ frames generated by the method according to the invention with the existing motion extrapolation based approaches in DVC coding-"Mobile"
Figure 10:
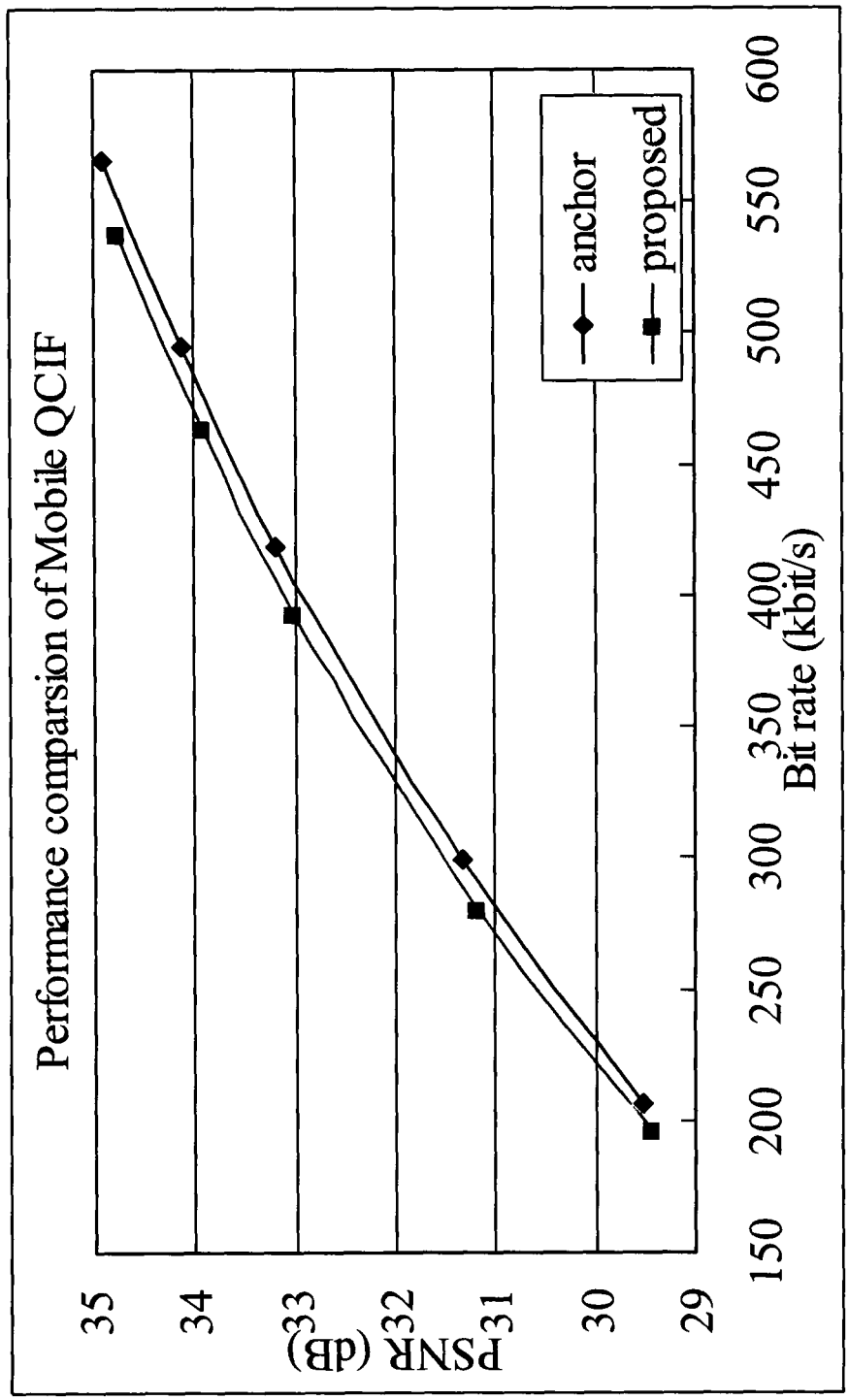
FIG. 10 is a comparison of the performance when the skip model was replaced by the method according to the invention for sequence "Mobile"; and, FIG. 11 is a comparison of the performance when the skip model was replaced by the method according to the invention for sequence "Tempete".
Figure 11:
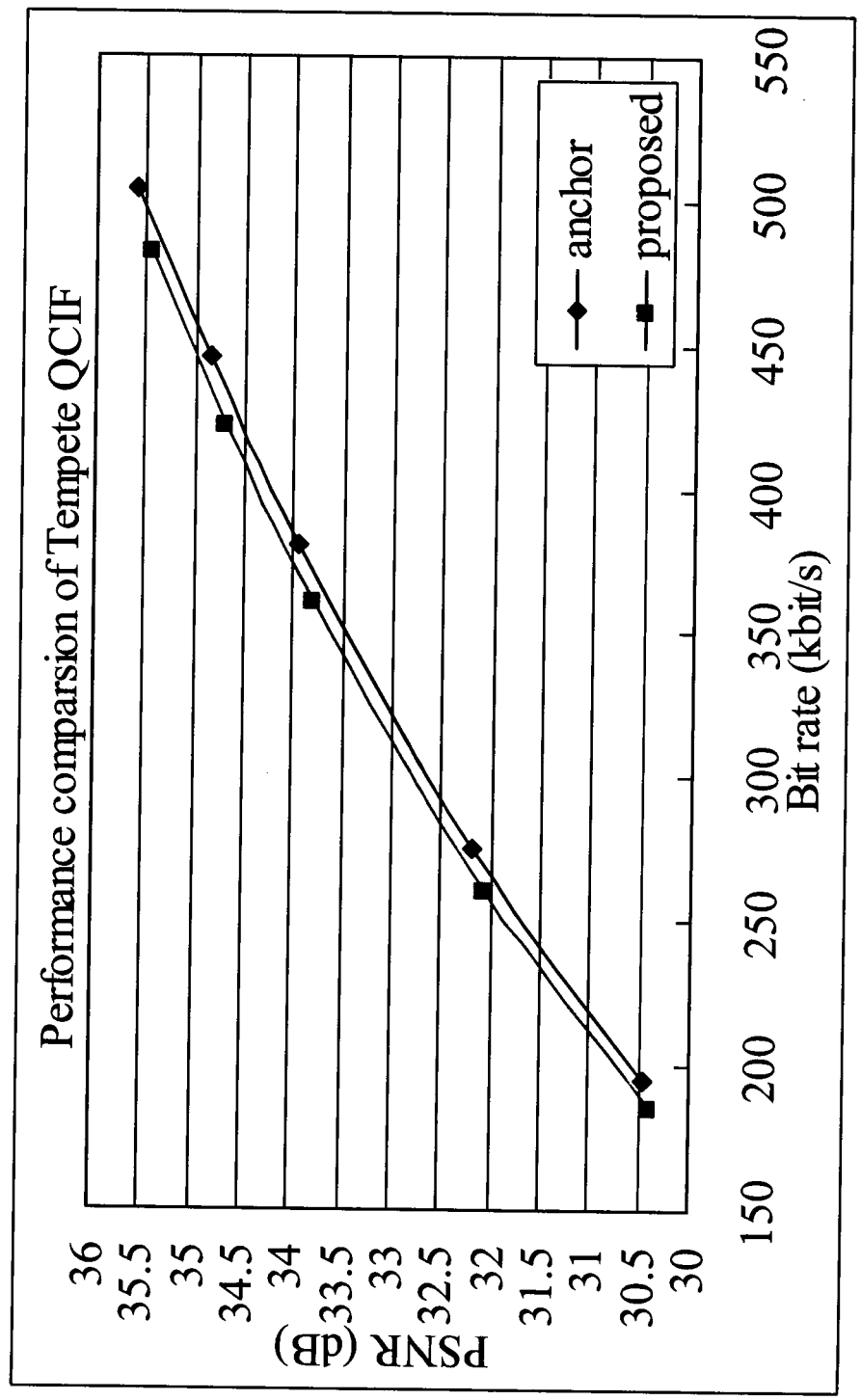

To verify the prediction efficiency of the proposed model, an example of implementation is made using the Distributed Video Coding (DVC) extrapolation. In DVC, the ultimate rebuilt Wyner-Ziv (WZ) frame is composed of the Side information (SI) pulsing the errors corrected by the parity bits. Consequently, the improvement of SI prediction constitutes one of the most critical aspects in improving the DVC compression efficiency. Since if the SI is of high quality, the energy of the residual information, which needs to correct the error between the SI and the original frame, decreases, and results in the reduction of transmitting the parity bits and thus reduce the bit rates. Since the method according to the invention is suitable for predicting the current frame just based on the available information in the past, it may be implemented in the extrapolation application in DVC, and compared with the existing extrapolation based approaches. In DVC, since the original pixel is not available in decoder side, the ME is performed in the past frames. For example, as in FIG. 2, for each block $B_t(k,l)$ in the predicted frame, we first use the collocated block $B_{t-1}(k,l)$ as the current block and find its MV in frame t−2, and then use MV to get the prediction of $B_t(k,l)$ by performing the MC process in frame t−1. In the illustrative embodiment of the method according to the invention, we use the same MV as the existing motion extrapolation based approach, and the comparison results are depicted in FIG. 6-9. We use H.263+ to the key frame, where the QP is set to be 8, and then encode the WZ frame using Turbo coder. The SI comparisons are depicted in FIG. 6 and FIG. 7. It can easily observe that the method according to the invention can significantly improve the PSNR values of the SI, compared with the existing motion extrapolation method. For example, the gain in Foreman QCIF sequence is more than 1.5 dB, and the gain in Mobile QCIF sequence is nearly 3 dB. The significant improvement greatly attributes to the superior ability prediction of the method according to the invention. FIGS. 8 and 9 present the WZ comparison of the method according to the invention the existing motion extrapolation method. It can be seen that in Foreman QCIF sequence, the gain is more than 1 db, and the gain in Mobile QCIF sequence, the gain is more than 2.5 dB.

The invention claimed is:

1. A method for computing a predicted frame $Y_t$ from a first reference frame $X_{t-1}$ and a second reference frame $X_{t-2}$, said method comprising, for each block of pixels in the predicted frame $Y_t$:
   a) defining a first block $B_{t-1}(k,l)$ of pixels in the first reference frame $X_{t-1}$, wherein a third block $B_t(k,l)$ of pixels in the predicted frame $Y_t$ is in the same location in the predicted frame $Y_t$ as the location of the first block $B_{t-1}(k,l)$ in the first reference frame $X_{t-1}$,
   b) defining a second block $B_{t-2}(\tilde{k}, \tilde{l})$ of pixels corresponding, in the second reference frame $X_{t-2}$, to the first block $B_{t-1}(k,l)$ of pixels along a motion vector $v_{t-1,t-2}(k,l)$ of said first block $B_{t-1}(k,l)$ from said first reference frame $X_{t-1}$ to said second reference frame $X_{t-2}$,
   c1) computing, using a processor, a first set of interpolation coefficients $\alpha_{i,j}$ allowing a transformation of the pixels of the first block $B_{t-1}(k,l)$ into pixels of the second block $B_{t-2}(\tilde{k}, \tilde{l})$,
   c2) computing, using the processor, a second set of interpolation coefficients $\beta_{i,j}$ allowing the transformation of the pixels of the second block $B_{t-2}(\tilde{k}, \tilde{l})$ into pixels of the first block $B_{t-1}(k,l)$,
   d) computing, using a processor, a first prediction of the pixels of the third block $B_t(k,l)$ using the first set of interpolation coefficients $\alpha_{i,j}$ and a second prediction of the pixels from a fourth block $B_{t-1}(\tilde{k}, \tilde{l})$ collocated in the first reference frame $X_{t-1}$ with the second block $B_{t-2}(\tilde{k}, \tilde{l})$ of pixels; and
   e) deriving, using the processor, the optimum prediction of the pixels in of third block $B_t(k,l)$ as being an average of the first and second predictions.

2. The method according to claim 1, wherein the blocks of pixels are square blocks of n×n pixels, with n being an integer greater than 1, the first and second set of interpolation coefficients corresponding to a first and second n×n matrices, and wherein in d), the computing takes into account said first matrix and the transposition of said second matrix.

3. An interpolating device for computing a predicted frame from a first and a second reference frames of a video flow, said device being arranged to select said first and second frames from the video flow, said device being further arranged for each block of pixels in the predicted frame to:
   a) define a first block $B_{t-1}(k,l)$ of pixels in the first reference frame $X_{t-1}$, wherein a third block $B_t(k,l)$ of pixels in the predicted frame $Y_t$ is in the same location in the predicted frame $Y_t$ as the location of the first block $B_{t-1}(k,l)$ in the first reference frame $X_{t-1}$,
   b) define a second block $B_{t-2}(\tilde{k}, \tilde{l})$ of pixels corresponding, in the second reference frame $X_{t-2}$, to the first block $B_{t-1}(k,l)$ of pixels along a motion vector $v_{t-1,t-2}(k,l)$ of said first block $B_{t-1}(k,l)$ from said first reference frame $X_{t-1}$ to said second reference frame $X_{t-2}$,
   c1) compute a first set of interpolation coefficients $\alpha_{i,j}$ allowing a transformation of the pixels of the first block $B_{t-1}(k,l)$ into pixels of the second block $B_{t-2}(\tilde{k}, \tilde{l})$,
   c2) compute a second set of interpolation coefficients $\beta_{i,j}$ allowing the transformation of the pixels of the second block $B_{t-2}(\tilde{k}, \tilde{l})$ into pixels of the first block $B_{t-1}(k,l)$,
   d1) compute a first prediction of the pixels of the third block $B_t(k,l)$ using the first set of interpolation coefficients $\alpha_{i,j}$ and a second prediction of the pixels from a fourth block $B_{t-1}(\tilde{k}, \tilde{l})$ collocated in the first reference frame $X_{t-1}$ with the second block $B_{t-2}(\tilde{k}, \tilde{l})$ of pixels; and
   e) derive the optimum prediction of the pixels in of third block $B_t(k,l)$ as being an average of the first and second predictions.

4. The device according to claim 3, wherein the blocks of pixels are square blocks of n×n pixels, with n being an integer greater than 1, the first and second set of interpolation coefficients corresponding to a first and second n×n matrices, the device being further arranged to compute the pixels of the predicted frame block taking into account said first matrix and the transposition of said second matrix.

5. A system for computing a predicted frame from a first and a second reference frame of a video flow, said system comprising:
   a transmitting device for transmitting the video flow,
   an interpolating device arranged to:

receive the video flow from the transmitting device, and select said first and second frames from the video flow, said device being further arranged for, for each block of pixels in the predicted frame, to:

a) define a first block $B_{t-1}(k,l)$ of pixels in the first reference frame $X_{t-1}$, wherein a third block $B_t(k,l)$ of pixels in the predicted frame $Y_t$ is in the same location in the predicted frame $Y_t$ as the location of the first block $B_{t-1}(k,l)$ in the first reference frame $X_{t-1}$, b) define a second block $B_{t-2}(\tilde{k}, \tilde{l})$ of pixels corresponding, in the second reference frame $X_{t-2}$, to the first block $B_{t-1}(k,l)$ of pixels along a motion vector $v_{t-1,t-2}(k,l)$ of said first block $B_{t-1}(k,l)$ from said first reference frame $X_{t-1}$ to said second reference frame $X_{t-2}$, c1) compute a first set of interpolation coefficients $\alpha_{i,j}$ allowing a transformation of the pixels of the first block $B_{t-1}(k,l)$ into pixels of the second block $B_{t-2}(\tilde{k}, \tilde{l})$, c2) compute a second set of interpolation coefficients $\beta_{i,j}$ allowing the transformation of the pixels of the second block $B_{t-2}(\tilde{k}, \tilde{l})$ into pixels of the first block $B_{t-1}(k,l)$, d1) compute a first prediction of the pixels of the third block $B_t(k,l)$ using the first set of interpolation coefficients $\alpha_{i,j}$ and a second prediction of the pixels from a fourth block $B_{t-1}(\tilde{k}, \tilde{l})$ collocated in the first reference frame $X_{t-1}$ with the second block $B_{t-2}(\tilde{k}, \tilde{l})$ of pixels; and e) derive the optimum prediction of the pixels in of third block $B_t(k,l)$ as being an average of the first and second predictions.

6. The system according to claim 5, wherein the blocks of pixels are square blocks of n×n pixels, with n being an integer greater than 1, the first and second set of interpolation coefficients corresponding to a first and second n×n matrices, the device being further arranged to compute the pixels of the predicted frame block taking into account said first matrix and the transposition of said second matrix.

7. A non-transitory computer program product providing computer executable instructions stored on a computer readable medium, which when loaded on to a data processor causes the data processor to perform the method for computing a predicted frame from a first and a second reference frames according to claim 1.

* * * * *